US010447525B2

(12) United States Patent
Patrich et al.

(10) Patent No.: US 10,447,525 B2
(45) Date of Patent: Oct. 15, 2019

(54) VALIDATING CORRELATION BETWEEN CHAINS OF ALERTS USING CLOUD VIEW

(71) Applicant: Microsoft Technology Licensing, LLC, Redmond, WA (US)

(72) Inventors: Dotan Patrich, Rishon LeZion (IL); Tomer Koren, Tel Aviv (IL); Mathias Scherman, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 172 days.

(21) Appl. No.: 15/613,708

(22) Filed: Jun. 5, 2017

(65) Prior Publication Data
US 2018/0351783 A1 Dec. 6, 2018

(51) Int. Cl.
*H04L 12/24* (2006.01)
*H04L 29/06* (2006.01)
*G06F 21/55* (2013.01)

(52) U.S. Cl.
CPC ........ *H04L 41/0636* (2013.01); *G06F 21/552* (2013.01); *H04L 41/0622* (2013.01); *H04L 63/20* (2013.01)

(58) Field of Classification Search
CPC ............... G06F 21/552; H04L 41/0622; H04L 41/0636; H04L 63/20
See application file for complete search history.

(56) References Cited

U.S. PATENT DOCUMENTS

| 7,379,993 | B2* | 5/2008 | Valdes .................. H04L 41/142 709/224 |
| 7,694,115 | B1* | 4/2010 | Porras ................... H04L 41/142 340/506 |
| 7,917,393 | B2 | 3/2011 | Valdes et al. |
| 9,294,489 | B2 | 3/2016 | Huh et al. |
| 9,378,111 | B2 | 6/2016 | Ramesh Coimbatore et al. |

(Continued)

FOREIGN PATENT DOCUMENTS

WO 2008079103 A2 7/2008

OTHER PUBLICATIONS

Bahareth, et al., "Constructing Attack Scenario using Sequential Pattern Mining with Correlated Candidate Sequences", In the Research Bulletin of Jordan ACM, vol. II(III), 2013, pp. 102-108.

(Continued)

*Primary Examiner* — Mohamed A. Wasel
(74) *Attorney, Agent, or Firm* — Fiala & Weaver P.L.L.C.

(57) ABSTRACT

Methods, systems, and apparatuses are provided for evaluating a chain of alerts. Historical alerts may be grouped together to form sets of alerts based on a predetermined relationship between the alerts. A score is determined for each set of alerts representing a statistical likelihood that one alert in the set is correlated to another alert in the set, generating a plurality of scores for the sets of alerts. The scores may be placed into a model containing a score for each set of alerts. After the model is formed, a received chain of alerts may be evaluated by examining whether the chain of alerts, or a sub-chain of alerts, corresponds to a score in the model through an iterative process. If the chain of alerts corresponds to a score in the model and meets a predetermined criteria, a system administrator can be alerted of the chain of alerts.

20 Claims, 7 Drawing Sheets

(56) References Cited

U.S. PATENT DOCUMENTS

| | | |
|---|---|---|
| 9,386,030 B2 | 7/2016 | Vashist et al. |
| 9,900,335 B2* | 2/2018 | Desch .................. H04L 63/102 |
| 2003/0093514 A1* | 5/2003 | Valdes ................. H04L 41/142 |
| | | 709/224 |
| 2005/0138425 A1 | 6/2005 | Kim et al. |
| 2007/0008098 A1 | 1/2007 | Wong |
| 2007/0169194 A1 | 7/2007 | Church et al. |
| 2012/0137367 A1 | 5/2012 | Dupont et al. |
| 2014/0047323 A1* | 2/2014 | Bourke ............... G06F 17/2247 |
| | | 715/234 |
| 2015/0128263 A1 | 5/2015 | Raugas et al. |
| 2017/0063917 A1 | 3/2017 | Chesla |
| 2017/0093902 A1 | 3/2017 | Roundy et al. |

OTHER PUBLICATIONS

U.S. Appl. No. 15/444,124, Israel, et al., "Detecting Cyber Attacks by Correlating Alerts Sequences in a Cluster Environment", Filed Date: Feb. 27, 2017, 51 pages.

"International Search Report and Written Opinion Issued in PCT Application No. PCT/US18/034978", dated Aug. 14, 2018, 11 Pages.

\* cited by examiner

500

600

VALIDATING CORRELATION BETWEEN CHAINS OF ALERTS USING CLOUD VIEW

BACKGROUND

Cloud computing is a form of network-accessible computing that provides shared computer processing resources and data to computers and other devices on demand over the Internet. Cloud computing enables the on-demand access to a shared pool of configurable computing resources, such as computer networks, servers, storage, applications, and services. Given the vast resources available on the cloud, cloud workload security has become increasingly important. In cloud computing systems, as well as conventional computer systems, a wide variety of alerts can be generated on the systems that resemble potential network attacks. To render a particular collection of alerts meaningful to a system administrator, the alerts are often grouped into incidents, or chains of alerts, that are related to each other. Instead of notifying the system administrator of each individual alert generated, the administrator can focus on alerts resembling attacks that are likely legitimate, rather than a harmless collection of alerts generated by Internet noise.

Several methods exist for correlating security alerts. One method of grouping such alerts is to locate alerts that appear close in time to each other, which may indicate an ongoing progression of an attack or an attack's advancement in a kill chain. However, in many cases, even when alerts appear to be temporally related, the alerts may nevertheless be unrelated to each other, leading to false positives being notified to the system administrator in charge of incident response. Alerts may also be validated not just by their temporal relationships to other alerts, but also by examining context associated with an alert. If an alert shares the same context with another alert, a system can deduce that a particular collection of alerts is part of a single security incident, and accordingly notify an administrator of the security incident. However, such a process requires additional resources, such as additional system administrators to constantly monitor and generate new rules. As both the number of connected systems and the number of potential attacks increases, the less scalable such an approach becomes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for evaluating a chain of alerts. Upon receiving a history of alerts, the alerts may be grouped together to form several sets of alerts. The grouping may be accomplished based on a predetermined relationship (e.g., a timing relationship) between the alerts. A score is then determined for each set of alerts that represents the statistical likelihood that one alert is correlated to another alert in the set, thereby creating a plurality of scores for the sets of alerts. The scores can be placed into a model that contains a score for each set of alerts. Based upon the model contents, a chain of alerts may be evaluated. The evaluation can be performed on a received chain of alerts. The model is analyzed to determine if the chain of alerts corresponds to a score in the model. If the chain of alerts corresponds to a score in the model, the score is compared to a predetermined criteria (e.g., as a threshold value). If the score meets the predetermined criteria, a system administrator can be alerted of the chain of alerts.

By using data mining techniques to examine the history of alerts, a model can be formed that contains a meaningful pattern of correlated alerts. In this manner, a chain of alerts can be evaluated quickly and with a high accuracy, thus decreasing the number of false positives that are notified to a system administrator who may oversee and/or implement incident response strategies. As the number of systems and alerts increases or changes, the model can be easily updated with minimal involvement of a system administrator, thereby further increasing the accuracy of the chain of alert evaluation.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
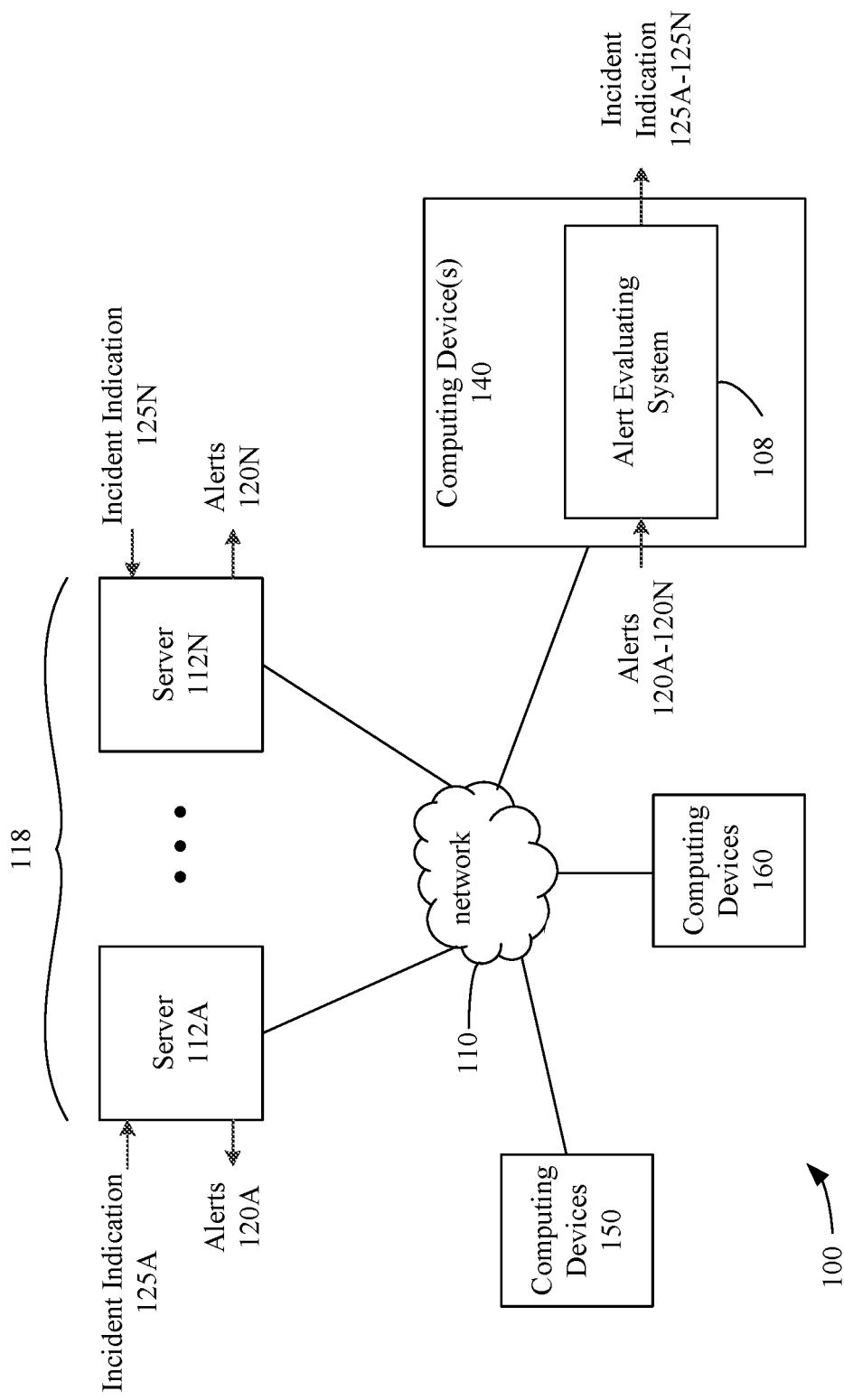
FIG. 1 shows a block diagram of a system for evaluating a chain of alerts, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud computing is a form of network-accessible computing that provides shared computer processing resources and data to computers and other devices on demand over the Internet. Cloud computing enables the on-demand access to a shared pool of configurable computing resources, such as computer networks, servers, storage, applications, and services, which can be rapidly provisioned and released to a user with reduced management effort relative to the maintenance of local resources by the user. Given the vast resources accessible on the cloud to users connected to the Internet, cloud workload security has become increasingly important. In cloud computing systems, as well as conventional computer systems, unauthorized users may launch attacks on devices connected to the system or on a network, leading to a generation of security alerts corresponding to such attempted attacks. To render these alerts meaningful to a system administrator, the alerts are often grouped into incidents containing chains of alerts that are related to each other. Instead of notifying the system administrator of each individual alert generated, which can lead to many false positives, the system can focus the administrator on groups of alerts resembling an actual attack, rather than a standalone alert generated based on Internet noise.

Security alerts may be grouped based on temporal relationships. For example, alerts may be grouped together if the alerts occurred close together in time, which may resemble an ongoing progression of an attack or an advancement in a kill chain. However, grouping alerts based solely on temporal relationships often lead to increased false positives being notified to the system administrator. Alternatively, alerts may be grouped based on contextual information, such as a username, process name, IP address, etc. associated with each alert. A system can be configured to deduce that alerts sharing the same context with other alerts may be part of the same incident, and accordingly notify the system administrator of a potential attack. Such a process requires additional effort to set up and manage a system, given that a system administrator may need to manually program such rules, as well as continually monitor the system to generate new rules. As both the number of connected systems and number of potential attacks increases, the less scalable such an approach becomes.

A cloud supporting service is defined herein as the service that manages the network-accessible server infrastructure. Examples of such a supporting service includes Microsoft® Azure®, Amazon Web Services™, Google Cloud Platform™, IBM® Smart Cloud, etc. The supporting service may be configured to build, deploy, and manage applications and services on the corresponding set of servers. There may be hundreds, thousands, or even greater numbers of instances of the cloud supporting services in operation in a large, worldwide platform of network-accessible servers. As a result, the number of possible security alerts that a system may generate are vast. Typically, alerts may be grouped together based on timing to reduce the number of incidents notified to an administrator. For example, if a particular alert [A] occurs at the same time as another alert [B], a system may deduce that two alerts are related. Therefore, when alert [A] and alert [B] occur together, the system will notify the administrator of a potential attack.

However, when a system groups alerts based on timing alone, the alerts may nevertheless be unrelated to each other, leading to unnecessary indications to a system administrator. Each time an administrator is notified of a potential attack, the administrator must expend resources to determine whether the alert necessitates an incident response, such as creating blocks or firewalls in a system or network to stop a current attack and/or prevent future attacks. If the administrator determines that the potential attack is a false positive, the administrator may need to manually program a logical rule to prevent similar false positives from occurring in the future. These time-consuming tasks reduce the administrator's time to monitor and respond to legitimate attacks, thus increasing the overall vulnerability of the system.

Embodiments disclosed herein overcome these issues by, instead of generating incidents based solely on alerts that appeared close in time to each other, forming a model containing a score representing a statistical likelihood of correlation between certain alerts based on historical data regarding the occurrences of such alerts. Once the model is created, the system can receive a chain of alerts from another source or application that has been identified as a potential incident. The system compares the chain of alerts to sets of alerts present in the model. If a score in the model corresponding to the received chain of alerts meets a predetermined criteria (such as a threshold value) the system validates the chain of alerts and notifies the administrator.

For example, embodiments described herein may analyze a history of alerts existing on a cloud service, such as alert logs generated by individual computing devices and/or servers connected to the cloud, or through logs aggregating a history of alerts across multiple computing devices and/or servers connected to the cloud. The historical alerts may then be grouped together based on a preexisting relationship, such as a timing relationship and/or whether the alert occurred on the same or similar resources. In one example, the grouping may be effected by locating alerts that appeared relatively close in time to one another to generate a plurality of sets of alerts.

Using the sets of alerts, a statistical analysis can be performed that determines a likelihood that one alert in the set of alerts is correlated to another alert. For example, the statistical analysis may assign a score representing a likelihood that the alerts in the set of alerts are related to each other. In one embodiment, the score may represent how unlikely the alerts in the group of alerts occurred by mere chance or by coincidence. In another embodiment, the score may be a lift score.

By way of example, after generating the sets of alerts, each possible combination of association rules is extracted. For example, if alerts [A, B, and C] were part of a group of alerts, each of the combinations [A→B, C], [→A, C], [C→A, B], [A, B→C], [A, C→B], [B, C→A] is extracted from the set of alerts. For each unique association rule, a statistical measure is determined, such as a lift score, representing the likelihood that the alerts are correlated with each other. The maximum score determined during this process may be the value stored in the model for a particular set of alerts. In one embodiment, a score is calculated for sets of alerts occurring in the past on more than a predetermined number of occasions, and is rendered unknown for sets of alerts not occurring more than a predetermined number of occasions. The output of the process is a model that contains a score for each set of alerts.

Although not necessary, the above approach may also take into consideration additional information accompanying the alerts, and adjust a score accordingly based on such additional information. In one embodiment, a system administrator may manually set rules identifying alerts or types of alerts that are related. In such an instance, a score calculation may take these additional rules into account prior to storing the score in the model.

Once the model is formed, a chain of alerts is received. The chain of alerts may be created by a separate process that determines, with some limited confidence, that the chain of alerts resembles a potential attack on a device or network. Using the model, the chain of alerts is evaluated to validate whether the chain of alerts accurately resembles an attack.

In one embodiment, the evaluation of a chain of alerts includes determining whether the received chain of alerts corresponds to a score in the model. If the chain of alerts corresponds to a score in the model, the score is compared to a predetermined criteria, such as a threshold value (e.g., being greater than, less than, equal to), a predetermined value range (e.g., being within the range), etc., before providing an indication to a user. In another embodiment, if the chain of alerts does not correspond to a score in the model or if the score does not meet the predetermined criteria, the process enters an iterative loop to determine whether a sub-chain of alerts corresponds to a score in the model. In this process, one alert is removed from the chain of alerts and the model is analyzed to determine whether a corresponding score exists for any of the sub-chains of alerts. In this manner, the model may be analyzed to determine whether any sub-chains of alerts that may be a part of the same attack vector as the original chain of alerts contains a corresponding score.

In one embodiment, during the iterative process, if a score in the model corresponding to any sub-chain of alerts meets a predetermined criteria, the iterative process may conclude and the user may be notified of potential security incident. For instance, the user may be notified of the chain of alerts and/or the sub-chain of alerts. In an embodiment, if more than one sub-chain of alerts is located in the model, it is determined whether the maximum score corresponding to a located sub-chain of alerts meets the predetermined criteria. In another embodiment, if the sub-chain of alerts does not correspond to a score in the model or if the score does not meet the predetermined criteria, the iterative process is repeated until only two alerts remain in the sub-chain. In this scenario, the iterative process ends, and the chain of alerts may be marked as a false positive and/or discarded.

This approach has numerous advantages, including: reducing false positives by validating incidents with advanced correlation techniques, thereby reducing the resources required to monitor the system, and being scale free because the model can be generated with little effort based on historical alerts (e.g., through alert logs) obtained from each computing device or server, individually or collectively, on a large interconnected network. Furthermore, the approach can leverage data available on the cloud by analyzing how different alerts are reported for different organizations, and uses data mining techniques over the history of alerts to find meaningful patterns of correlated alerts. In addition, by relying on advanced correlation techniques instead of semantic rules implemented by a system administrator, the time required to release security solutions to customers, update, and/or monitor such solutions is reduced.

Furthermore, when a system logs new alerts or the frequency and/or occurrences of existing alerts change, the model is easily adaptable by updating the scores using the updated alert logs. This technique requires minimal intervention by a system administrator, since the model can be automatically updated using the updated alerts.

Still further, by notifying the administrator of incidents with an even higher degree of accuracy, the administrator can devote more resources to developing appropriate incident response strategies for legitimate attacks.

Accordingly, embodiments provide the following (and additional) capabilities pertaining to evaluating a chain of alerts: (1) A mechanism to reduce the resources required to monitor a system for potential attacks; (2) A scale-free mechanism to perform security monitoring across a large network of systems; (3) A mechanism to determine meaningful patterns of alerts based on historical information; (4) A mechanism to provide for a relatively simple manner of updating a model containing scores for correlated alert with minimal human involvement; and (5) A mechanism to increase the accuracy of security incidents notified to a system administrator.

As follows, example embodiments are described herein directed to techniques for evaluating and categorizing a chain of alerts. For instance, FIG. 1 shows a block diagram of an example system 100 for evaluating and categorizing a chain of alerts, according to an example embodiment. As shown in FIG. 1, system 100 includes a plurality of servers 112A-112N, one or more computing device(s) 140, computing devices 150, and computing devices 160. Servers 112A-112N define a network-accessible server infrastructure 118. Servers 112A-112N, computing device(s) 140, computing devices 150, and computing devices 160 are communicatively coupled via one or more networks 110. Though computing device(s) 140 is/are shown separate from servers 112A-112N, in an embodiment, computing device(s) 140 may be included as node(s) in one or more of servers 112A-112N. Network 110 may comprise one or more networks such as local area networks (LANs), wide area networks (WANs), enterprise networks, the Internet, etc., and may include one or more of wired and/or wireless portions. In an embodiment, computing device(s) 140, computing devices 150, and each server 112A-112N may communicate via one or more application programming interfaces (API).

Servers 112A-112N may form a network-accessible server set, such as a cloud computing server network. For example, each of servers 112A-112N may comprise a group or collection of servers (e.g., computing devices) that are each accessible by a network such as the Internet (e.g., in a "cloud-based" embodiment) to store, manage, and process data. Each of servers 112A-112N may comprise any number of computing devices, and may include any type and number of other resources, including resources that facilitate communications with and between the servers, storage by the servers, etc. (e.g., network switches, storage devices, networks, etc.). Servers 112A-112N may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers 112A-112N may be co-located (e.g., housed in one or more nearby buildings with associated components such as backup power supplies, redundant data communications, environmental controls, etc.) to form a datacenter, or may be arranged in other manners. Accordingly, in an embodiment, servers 112A-112N may each be a datacenter in a distributed collection of datacenters.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

In accordance with such an embodiment, each of servers 112A-112N may be configured to service a particular geographical region. For example, server 112A may be configured to service the northeastern region of the United States, and server 112N may be configured to service the southwestern region of the United States. In another example, server 112A may be configured to service the northwestern region of the United States, and server 112N may be configured to service the southeastern region of the United States. It is noted that the network-accessible server set may include any number of servers, and each server may service any number of geographical regions worldwide.

Each of servers 112A-112N may be configured to execute one or more services (including microservices), applications, and/or supporting services. A "supporting service" is a cloud computing service/application configured to manage a set of servers (e.g., a cluster of servers in servers 112A) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language. Each of servers 112A-112N may be configured to execute any number of supporting service, including multiple instances of the same supporting service.

Servers 112A-112N and/or computing device(s) 140 generate alerts 120A-120N that may be perceived as threats to any of servers 112A-112N, network 110, or any other device connected to network 110. For instance, alerts 120A-120N include any security alerts that are perceived as unauthorized or illegitimate attempts to access servers 112A-112N, network 100, or any other device connected to network 110. Alerts 120A-120N may also include comprise one or more alert(s) resulting from Internet noise that any of servers 112A-112N or computing device(s) 140 view as a potential threat.

Computing devices 150 includes the computing devices of users (e.g., individual users, family users, enterprise users, governmental users, etc.) that access servers 112A-112N for cloud computing resources through network 110. Computing devices 150 may include any number of computing devices, including tens, hundreds, thousands, millions, or even greater numbers of computing devices. Computing devices of computing devices 150 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing devices 150 may each interface with servers of servers 112A-112N through application programming interfaces and/or by other mechanisms. Note that any number of program interfaces may be present.

Computing device 160 includes the computing devices of potential attackers that may attempt to access network-accessible servers 112A-112N, network 110, or any other device connected to network 110 for any unauthorized purpose. Computing devices 160 may also include devices connected through network 110 that generate Internet noise, or other harmless signals that servers 112A-112N and/or computing device(s) 140 view as a potential threat. Computing device 160 may include any number of computing devices. Computing devices of computing device 160 may each be may be any type of stationary or mobile computing device, similar to computing device 150.

Computing device(s) 140 perform management and/or monitoring functions for servers 112A-112N. For instance, as shown in FIG. 1, computing device(s) 140 includes alert evaluating system 108. Alert evaluating system 108 is configured to manage and/or monitor the security of servers 112A-112N, and optionally computing device(s) 140, network 110, and/or any other device connected to network 110 from potential attacks. Alert evaluating system 108 is configured to receive alerts 120A-120N and monitor and/or manage the security of servers 112A-112N through network 110. Computing device(s) 140 may also detect, separately or in conjunction with servers 112A-112N, alerts 120A-20N that may be perceived as potential threats to any of servers 112A-112N, network 110, or any device connected to network 110.

Alert evaluating system 108 may generate one or more incident indications 125A-125N based on an analysis of one or more of alerts 120A-120N. Alert evaluating system 108 may transmit incident indications 125A-125N to a system administrator using and/or accessing one or more computing device(s) 140 following a determination by the alert evaluating system 108 that one or more chains of alerts is/are a threat to the security of any of servers 112A-112N, network 110, or any other device connected to network 110. Incident indications 125A-125N may include any type of indication, including any one of an audible indication, visual indication, haptic indication, or any indication that may be stored electronically. Alert evaluating system 108 may also transmit incident indications 125A-125N to any of servers 112A-112N following a determination by the alert evaluating system 108 that a chain of alerts is a threat to the security of any of servers 112A-112N, network 110, and/or any other device connected to network 110.

Note that alerts 120A-120N may include any type of security alert regarding an actual or potential threat to any of servers 112A-112N, network 110, or any other device connected to network 110. Although described herein with respect to alerts occurring on servers 112A-112N, network 110, or devices connected to network 110, alerts 120A-120N are not limited to network security alerts. For example, alerts 120A-120N may comprise any type of security alert, including but not limited to a potential virus alert, web application firewall alert, endpoint data protection alert, etc. Similarly, alerts 120A-120N are not limited to security alerts generated in cloud computing systems described herein as exemplary embodiments. Alert evaluating system 108 may also operate on one or more standalone devices connected to a network in which security alerts are generated.

Alerts 120A-120N may also include contextual information, such as a username, process name, IP address, etc. Alerts 120A-120N may also include other contextual information, such as a temporal or any other relationship with one or more other alerts 120A-120N. Alerts 120A-120N may be individual alerts, groups of alerts, logs of alerts, or chains of alerts that may together resemble a potential threat.

Figure 2:
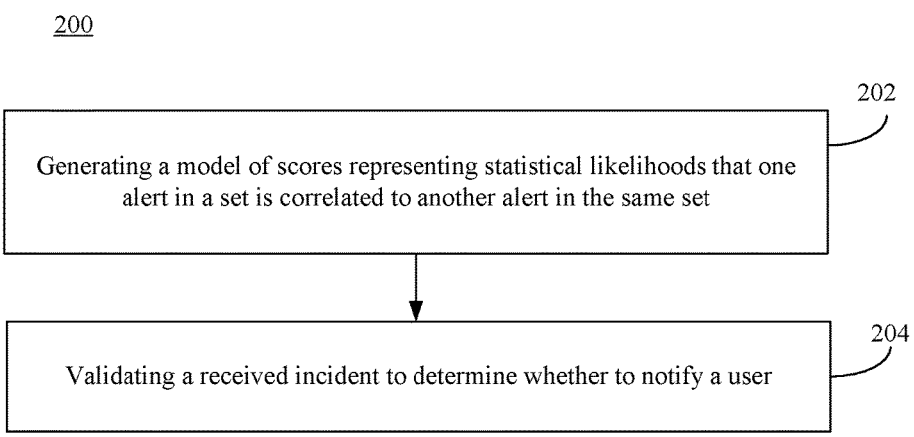
FIG. 2 shows a flowchart for evaluating a chain of alerts, according to an example embodiment.

Accordingly, in embodiments, security alerts are monitored across devices connected to network-accessible server infrastructure 118. Alert evaluating system 108 may monitor security and evaluate incidents in various ways. For example, FIG. 2 shows a flowchart 200 for evaluating alerts across the network-accessible server infrastructure 118, according to an example embodiment. In an embodiment, flowchart 200 may be implemented by alert evaluating system 108. FIG. 2 is described with continued reference to FIG. 1. Other structural and operational embodiments will be apparent to persons skilled in the relevant art(s) based on the following discussion regarding flowchart 200 and system 100 of FIG. 1.

Flowchart 200 begins with step 202. In step 202, a model is generated that contains scores representing statistical likelihoods that one alert in a set of alerts is correlated to another alert in the same set of alerts. For example, with reference to FIG. 1, alert evaluating system 108 receives alerts 120A-120N, which may contain historical security alerts across any of servers 112A-112N, network 110, and/or any other device connected to network 110. Alerts 120A-120N may be received from any one or more of servers 112A-112N or any other device connected to network 110, or alternatively may be obtained directly or indirectly from computing device(s) 140. Alert evaluating system 108 may group received alerts 120A-120N into sets of alerts based on a predetermined relationship between the alerts. Following the grouping of alerts 120A-120N into sets of alerts, alert evaluating system 108 calculates scores for each set of alerts and generates a model that includes the calculated scores.

In step 204, a potential security incident, also referred to herein as a chain of alerts, is validated to determine whether a system administrator should be notified. For instance, with reference to FIG. 1, alert evaluating system 108 may receive alerts 120A-120N as a chain of alerts resembling a potential security incident. The chain of alerts may be a string of alerts grouped together by another resource or application that determines, with some limited confidence, that the chain of alerts collectively resemble a potential threat to any of servers 112A-112N, network 110, or any device connected to network 110. The chain of alerts may be obtained from any one or more of servers 112A-112N or may be obtained from computing device(s) 140. The potential security incident, obtained as a chain of alerts, includes any type of security alert regarding an actual or potential threat to any of servers 112A-112N, network 110, or any other device connected to network 110. The potential security incident may also include contextual information, such as a username, process name, IP address, resource, etc., and/or any temporal or any other relationship between any alerts in the chain of alerts. In one embodiment, the potential security incident may also include additional contextual information pertaining to a confidence level of the legitimacy of the potential threat from the other resource or application responsible for grouping together the alerts as a chain of alerts.

In an embodiment, the step of validating a potential security incident includes determining whether the chain of alerts corresponds to a score in the model. If the chain of alerts corresponds to a score in the model and the score meets a predetermined criteria, a notification of the potential security incident is sent to the user or system administrator. For instance, with reference to FIG. 1, alert evaluating system 108 may transmit incident indication 125A-125N following a determination that a potential security incident is validated as a threat to any of servers 112A-112N, network 110, and/or any other device connected to network 110. Incident indication 125A-125N may comprise any type of indication, may be stored in a log, and/or may be transmitted to any of servers 112A-112N, any other computing device(s) 140, and/or any other device on network 110. By validating a potential security incident using a model of scores, alert evaluating system 108 can more accurately determine which potential security incidents are legitimate attacks that may necessitate a response by a system administrator, versus potential security incidents that are false positives, for example, resulting from chain of alerts containing unrelated alerts.

Figure 3:
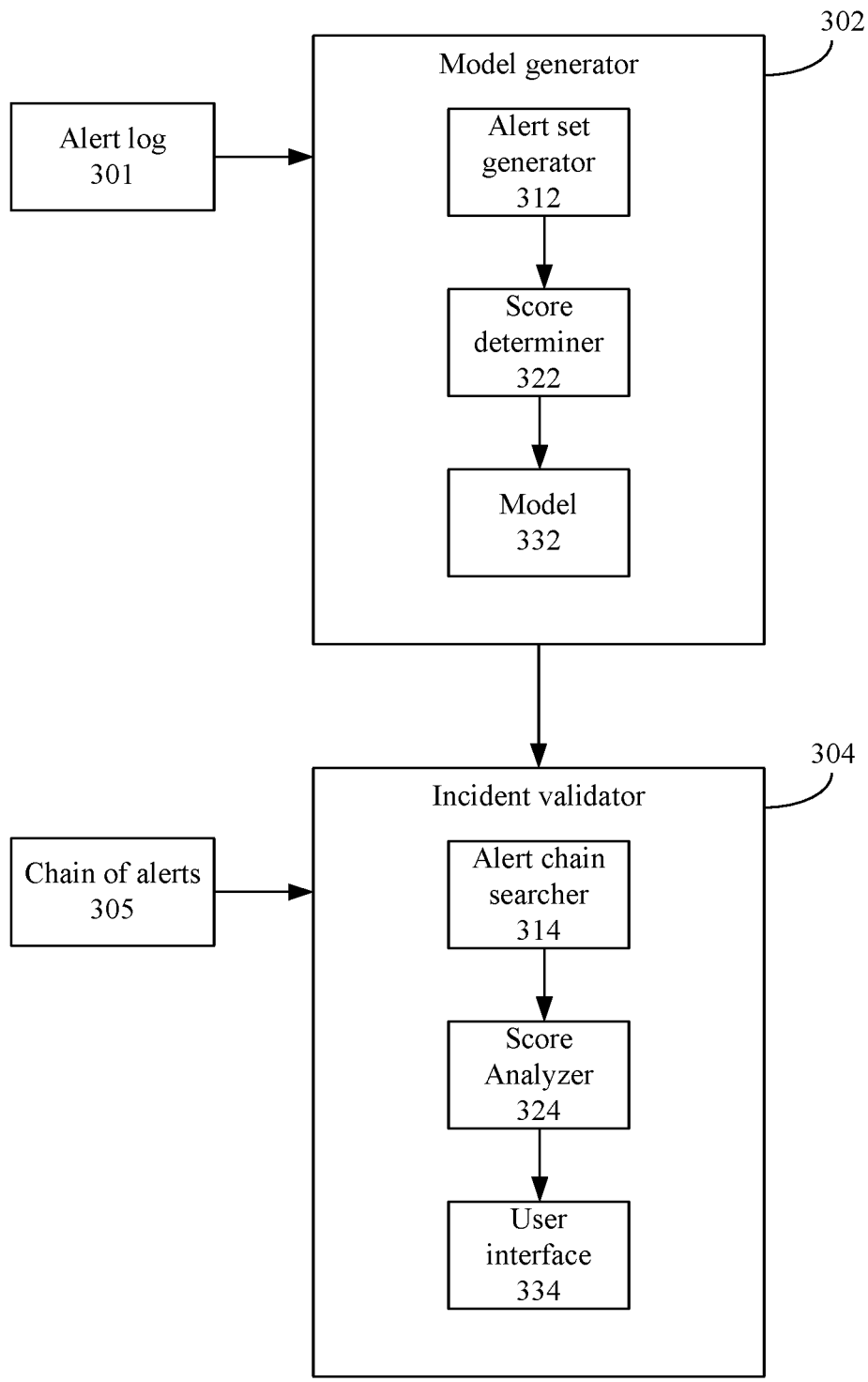
FIG. 3 shows a block diagram of a system including a model generator and an incident validator, according to an example embodiment.

In embodiments, alert evaluating system 108 may operate in various ways to evaluate a chain of alerts. For instance, FIG. 3 shows a block diagram of an alert evaluating system 300, according to an example embodiment. Alert evaluating system 300 may be implemented in computing device(s) 140, similar to alert evaluating system 108 described above with reference to FIG. 1. As shown in FIG. 3, alert evaluating system 300 includes a model generator 302 and an incident validator 304. In this example, model generator 302 receives alert log 301. Model generator 302 further includes an alert set generator 312, a score determiner 322, and a model 332. As shown in FIG. 3, incident validator 304 receives chain of alerts 305 from another resource or application that is configured to generate potential security incidents. Incident validator 304 further includes an alert chain searcher 314, a score analyzer 324, and a user interface 334.

Collectively, model generator 302 and incident validator 304 are an example of alert evaluating system 108 of FIG. 1.

Figure 4:
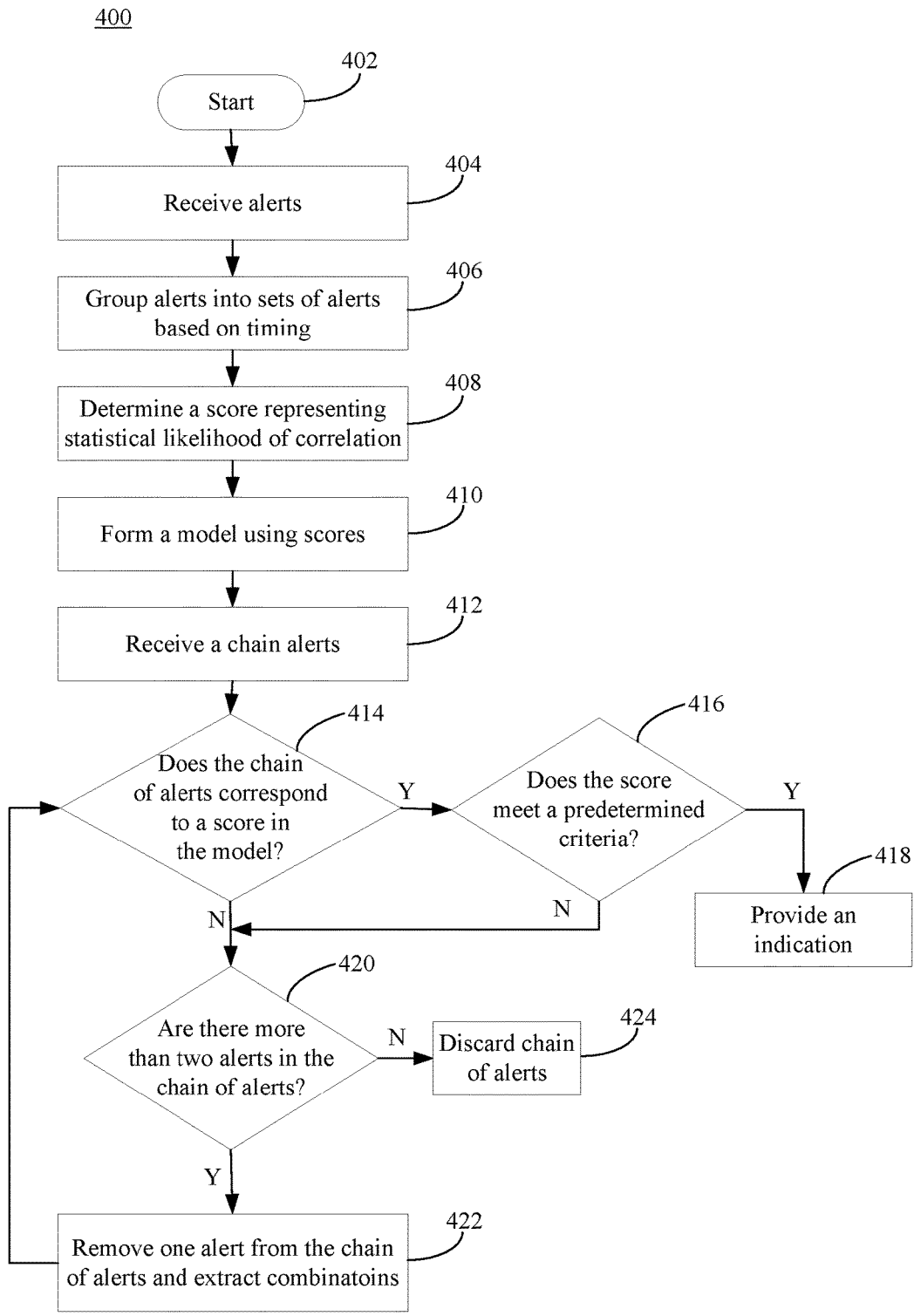
FIG. 4 shows a flowchart for evaluating a chain of alerts, according to another an example embodiment.

FIG. 4 shows a flowchart 400 providing a process for generating a model and validating a received chain of alerts, according to an example embodiment. For purposes of illustration, flowchart 400 of FIG. 4 is described with respect to FIGS. 1 and 3. For instance, alert evaluating system 108 and/or alert evaluating system 300 may operate according to flowchart 400, in an embodiment. Alert evaluating system 108, alert evaluating system 300, and flowchart 400 are described as follows. Note that the steps of flowchart 400 may be performed in an order different than shown in FIG. 4 in some embodiments. Furthermore, not all steps of flowchart 400 need to be performed in all embodiments. Further structural and operational embodiments will be apparent to persons skilled in the relevant art(s) based on the following description regarding flowchart 400.

Flowchart 400 commences at step 402. At step 404, alerts are received. In an embodiment, alerts are obtained from any of servers 112A-112N and/or computing device(s) 140. For example, in an embodiment, model generator 302 receives alert log 301, which may contain historical data regarding alerts on network 110 or one or more devices connected to network 110. For instance, with respect to FIG. 1, alert log 301 may include alerts 120A-120N received from servers 112A-112N and/or detected by computing device(s) 140. Alert log 301 may be generated by one or more servers 112A-112N connected to network 110, or by computing device(s) 140, and may contain an aggregated history of alerts across any of the devices connected to network 110. Alert log 301 may also be stored on any of servers 112A-112N, on computing device(s) 140, or on any other device connected to network 110 with a suitable storage medium, such as a hard disk, solid-state drive, magnetic disk, optical disk, read-only memory (ROM), or random-access memory (RAM). Alert log 301 may also include contextual information regarding alerts, such as a date/time of each alert, process name of process generating the alert, user name under which the alert is generated, IP address of the alert source, etc.

Referring back to FIG. 4, in step 406, alerts are grouped into sets based on a predetermined relationship. As shown in FIG. 3, in an embodiment, alert set generator 312 groups alerts contained within alert log 301 into a plurality of alert sets comprising one or more alerts based on a predetermined relationship between the alerts. In one example, alert set generator 312 groups alerts contained within alert log 301 based on a timing relationship between the alerts. For instance, alert set generator 312 may group together alerts in alert log 301 that commonly occur together at the same time, or nearly the same time. In one example, alert set generator 312 may group alerts into a set that occur within a predetermined time interval. In another example, alert set generator 312 may create a set of alerts containing alerts in a sequence of alerts that begins with a first alert and continues until a predetermined length of time passes during which no further alerts are received. In another embodiment, alert set generator 312 may group together alerts in alert log 301 using contextual information (e.g., username, process name, IP address, etc.) included in alert log 301. In yet another embodiment, alert set generator 312 may group together alerts in alert log 301 using any number of predetermined criteria, including but not limited to temporal and/or contextual information contained within alert log 301.

In step 408, for each set of alerts, a score is determined that represents a statistical likelihood of correlation between the alerts. For example, with reference to FIG. 3, score determiner 322 determines, for each set of alerts, the likelihood that one alert in the set of alerts is correlated to another alert in the same set. In one embodiment, score determiner 322 calculates a score representing a statistical likelihood that at least one alert in the set of alerts is correlated to at least one other alert in the set. In another embodiment, the determined score may represent how unlikely the alerts in the group of alerts occurred by chance or coincidence. Score determiner 322 determines a plurality of scores for the alert sets generated by alert set generator 312. Score determiner 322 may use any suitable technique for generating the score representing statistical likelihood, such as a lift score, a correlation function, etc.

For example, score determiner 322 may extract each combination of unique associations between alerts contained with each alert set. For instance, if alert set generator 312 generated a set of alerts comprising alerts [A, B, and C], score determiner may extract each unique association between the alerts [A, B, and C]. In this example, score determiner 322 may extract combinations [A→B, C], [B→A, C], [C→A, B], [A, B→C], [A, C→B], [B, C→A]. For example, the combination [A→B, C] may represent the likelihood that alert [A] is correlated to the occurrence of alert [B] and alert [C]. in this example, score determiner 322 determines a score for each association rule extracted. The maximum score determined by score determiner 322 across the combination of unique associations for a particular set of alerts may be assigned by score determiner 322 as the score for the particular set of alerts.

In one embodiment, score determiner 322 determines a lift score for each unique combination. A lift score may be determined by first extracting the association rules for each set of alerts similar to the manner described above. In an illustrative example where a set of alerts includes alerts [A, B, and C], score determiner 322 may extract combinations [A→B, C], [B→A, C], [C→A, B], [A, B→C], [A, C→B], [B, C→A] resembling the association rules. The support of a lift score represents how often one side of an association rule occurs in an overall set of data. For instance, the support may represent how often certain alerts on the left side of the association rule occur in alert log 301, or how often certain alerts on the right side of the association rule occur in alert log 301. The confidence of the lift score measures how often the right side of the association rule occurs in instances involving the left side. For instance, in the above example, the confidence of a particular rule measures how often the alerts on the right side of the association rule occur when alerts on the left side of the rule occur. The higher the confidence, the more likely that the alerts in the association rule are correlated with each other. A lift score may be calculated as a ratio between an association rule's confidence and the support of the right side of an association rule. A lift score may also be calculated as the support of the union of both sides of a particular association rule, divided by the product of the support of the left side and the support of the right side. The greater the lift score, the more likely that the alerts are correlated to each other.

In an embodiment, score determiner 322 may determine or calibrate scores for sets of alerts occurring in the past on more than a predetermined number of occasions. For example, if a particular set of alerts occurred relatively infrequently in alert log 301, score determiner 322 may determine that the set of alerts occurred only by chance and therefore the alerts are not correlated with one another, or their calculated score may be scaled lower. For a set of alerts that occurs relatively infrequently, score determiner 322 may assign a zero score, low score, or set the score as unknown.

Referring back to FIG. 4, in step 410, a model is formed that contains the determined scores. For example, as seen in FIG. 3, score determiner 322 may output model 332, which contains, for each set of alerts generated by alert set generator 312, a score generated by score determiner 322 (in step 408) representing a statistical likelihood that the alerts in the set of alerts are correlated to each other. Model 332 may be stored at one or more servers 112A-112N, computing device(s) 140, or other devices connected to network 110 in a suitable storage medium, such as a hard disk, solid-state drive, magnetic disk, optical disk, ROM, or RAM.

Score determiner 322 may also take into account additional information, such as contextual information associated with an alert or set of alerts or manual rules assigned by a system administrator in assigning a score for each set. For instance, a system administrator may manually set rules identifying alerts or types of alerts that are correlated or indicative of an attack on device or network. In such an instance, score determiner 322 may take the manual rules or contextual information into account prior to storing the score (e.g., by scaling the score accordingly) in the model. Score determiner 322 may use the manual rules or contextual information to adjust or override scores calculated in accordance with an embodiment. Score determiner 322, however, need not take into account any such additional rules or contextual information.

After a model is formed, the model may be used to evaluate further received alerts to determine related alerts for grouping into incidents. By grouping alerts into incidents, large numbers of alerts no longer need be individually assessed, but instead, a smaller number of alert groups may be handled, easing a burden on IT professionals/administrators or other users involved in handling alerts. Steps 412-422 of flowchart 400 relate to the grouping of related alerts for easier handling based on the model generated in steps 404-410.

Referring to FIG. 4, in step 412, a chain of alerts is received. For instance, in FIG. 3, incident validator 304 receives chain of alerts 305, which may be a potential security incident. Chain of alerts 305 is a string of alerts that generated by one or more security applications or resources (e.g., servers) separate from alert evaluating system 108. The security application(s)/resource(s) may determine, with some limited confidence, that chain of alerts 305 may be a security threat to any of servers 112A-112N, network 110, or any other device connected to network 110. As discussed above, chain of alerts 305 may also include contextual information, such as a username, process name, IP address, resource, etc., for each alert and/or any temporal or other relationship between any alerts in the chain of alerts. Chain of alerts 305 may also include a confidence level of the perceived threat determined by the other resource or application. Chain of alerts 305 may be received from any of servers 112A-112N or may be detected and/or obtained by computing device(s) 140, as illustrated in FIG. 1.

In step 414, it is determined whether the received chain of alerts corresponds to a score in the model. In the illustrative example of FIG. 3, alert chain searcher 314 may analyze model 332 to determine whether chain of alerts 305 corresponds to a score in the model. For instance, alert chain searcher 314 may search model 332 for a set of alerts in model 332 that matches chain of alerts 305 (i.e., includes the same alert members). In an illustrative example, if chain of alerts 305 contained alerts [A, B, C], alert chain searcher 314 may analyze model 332 to determine if the set of alerts [A, B, C] is present (and having an associated score). If chain of alerts 305 has a match in model 332, operation proceeds from step 414 to step 416. If chain of alerts 305 does not have a match in model 332, operation proceeds from step 414 to step 420.

In step 416, if the chain of alerts (or any sub-chain of alerts extracted in step 422) corresponds to a score in the model, it is determined whether the score meets a predetermined criteria. In an embodiment, with respect to FIG. 3, once chain of alerts 305 (or a sub-chain of alerts thereof) is located in model 332, score analyzer 324 determines whether the corresponding score in model 332 meets a predetermined criteria (e.g., has a relationship with a threshold value, a value range, etc.). In an illustrative example, score analyzer 324 determines whether the corresponding score is above a threshold value. The threshold value may be a value at which a score corresponding to a chain of alerts (or sub-chains of alerts) is designated as a legitimate security threat to any of servers 112A-112N, network 110, or any other device connected to network 110. For example, if a score for a chain of alerts is above a threshold value, score analyzer 324 may decide that the chain of alerts indicates an actual threat to network 110 or one of the devices connected to network 110. If the score is below the threshold value, operation proceeds to the iterative loop at step 420, described below, whereby one alert is removed and the extracted sub-chains of alerts are analyzed.

Note that the threshold value may be automatically determined by score analyzer 324 (e.g., using machine learning analysis of prior alerts and incidents), or may be determined by a system administrator in charge of managing the security of servers 112A-112N, network 110, or any of the devices connected to network 110. In embodiments, score analyzer 324 may take into account any contextual information or manual rules identifying alerts or types of alerts that are correlated or indicative of an attack on a device or network. For example, using contextual information and/or manual rules, in whole or in part, score analyzer 324 may determine that the chain of alerts is a legitimate attack, as opposed to a false positive.

As noted above, if score analyzer 324 determines the score meets the predetermined criteria, operation proceeds from step 416 to step 418. If score analyzer 324 determines the score does not meet the predetermined criteria, operation proceeds from step 416 to step 420.

In step 418 of FIG. 4, if the score meets a predetermined criteria, an indication is provided to an administrator. For example, in FIG. 3, if score analyzer 324 determines that a score corresponding to chain of alerts 305 (or a sub-chain of alerts) meets the predetermined criteria, user interface 334 provides a notification to a system administrator of the validated incident. The notification may be provided at a computing device of computing device(s) 140, or transmitted to a different computing device, and may be provided in any manner, including via email, a text message, communicated to a browser, and can be shown as text, played as audio, displayed in an image or video, etc. As shown in FIG. 3, score analyzer 324 may provide a notification for play or display to a system administrator (or other user) via user interface 334. The notification may identify chain of alerts 305 and/or any sub-chain of alerts analyzed during the iterative process and determined as a validated incident. User interface 334 may be any one of a graphical user interface, audio interface, haptic interface, or any other interface a user may access and/or monitor. In an embodiment, the notification is an example of one of incident indications 125A-125N, or may be transmitted to multiple locations as more than one of incident indications 125A-125N, described above with respect to FIG. 1. As shown above, incident indications 125A-125N may be transmitted to any or all of servers 112A-112N, or to computing device(s) 140, each of which may contain a corresponding user interface 334. Operation of flowchart 400 ends after step 418.

In step 420 of FIG. 4, if a chain of alerts does not correspond to a score in the model, the process enters an iterative loop to search for sub-chains of alerts that exist in the model. As seen in FIG. 4, the iterative process concludes when either a sub-chain of alerts has a score that meets a predetermined criteria, or only two alerts remain in the sub-chain of alerts. For example, in step 420, once a determination is made that a chain of alerts (or sub-chain of alerts) does not contain a score in the model, it is next determined whether there are more than two alerts in the chain of alerts. If there are more than two alerts in the chain of alerts (or sub-chain of alerts), operation proceeds from step 420 to step 422. If there are two alerts in the chain of alerts, operation proceeds from step 420 to step 424.

In step 422, an alert is removed from the chain of alerts (or sub-chain of alerts) and all remaining combinations are extracted. In particular, if a chain of alerts contained N alerts, where N is the number of alerts, all sub-chains of alerts containing N−1 alerts are extracted. By using the iterative process whereby one alert is removed from the chain of alerts, model 332 can be analyzed for all possible remaining combinations of alerts to more optimally determine whether a chain of alerts resembles a legitimate attack on a server or network. Furthermore, because the iterative process described herein attempts to extract all meaningful chains of alerts that are likely to be related to the same security threat, the accuracy of the alert evaluating system may be improved, thereby reducing the number of false positives notified to a system administrator.

For example, with reference to FIG. 3, if chain of alerts 305 does not correspond to a score in model 332, alert chain searcher 314 may undergo an iterative process by which one alert is removed from chain of alerts 305, thereby creating additional sub-chains of alerts. In the above illustrative example, if the chain of alerts 305 containing alerts [A, B, C] is not located in model 332, one alert is removed from the chain of alerts, and all the remaining combinations are extracted as sub-chains of alerts. In this example, the resulting set of possible sub-chains of alerts after removing one alert would be [A, B], [A, C] and [B, C]. Each of these sub-chains of alerts may be searched for in model 332 in a next iteration of step 414. In an embodiment, alert chain searcher 314 may use additional information, such as contextual information or timing information accompanying the alerts in the chain of alerts, to determine which alert to remove during the iterative process. For example, alert chain searcher 314 may remove an alert with a known weaker relation to the remaining alerts in chain of alerts 305, thereby generating a sub-chain comprising alerts with a stronger relationship between each other. By selectively removing alerts based on the additional information, the time required to validate chain of alerts 305 may be reduced.

Following extraction of the sub-chains of alerts after removing one alert, the process proceeds back to step 414 to determine whether any of the extracted sub-chains of alerts correspond to a score in the model. In an embodiment, this step is accomplished by alert chain searcher 314, which may analyze model 332 to determine whether any of the extracted sub-chains of alerts corresponds to a score in model 332. In one example, alert chain searcher 314 checks whether each extracted sub-chain of alerts contains a corresponding score in model 332. If only one sub-chain of alerts is located with a corresponding score, the process proceeds to step 416 using the score for the sub-chain located in the model. If alert chain searcher 314 locates more than one sub-chain of alerts in model 332, the maximum score corresponding to the located sub-chains of alerts may be used in step 416.

In step 424, if it is determined that only two alerts remain in the chain of alerts, the chain of alerts is rendered a false positive and the chain of alerts may be discarded. Alternatively, the chain of alerts may be stored in a log for the administrator to access and analyze. The log may be stored on any suitable memory device on any of servers 112A-112N or computing device(s) 140. In another example, incident validator 304 may provide a notification to the system administrator (e.g., via user interface 334) that the received chain of alerts is a false positive and/or need not necessitate an incident response.

Figure 5:
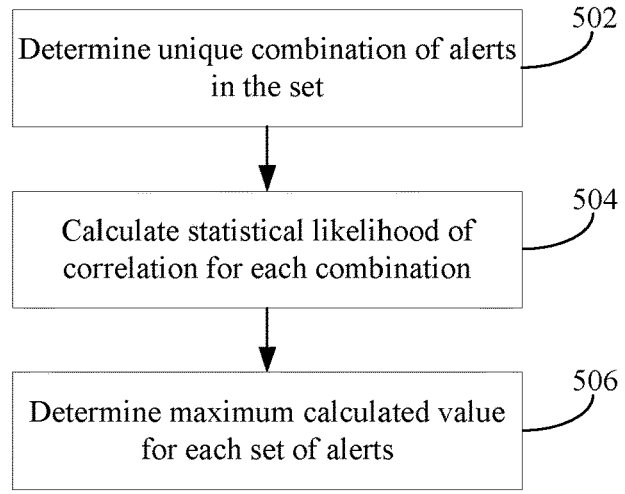
FIG. 5 shows a flowchart for determining a statistical likelihood of a correlation between alerts, according to an example embodiment.

As described above, in an embodiment, score determiner 322 may operate in various ways to determine a score for a set of alerts. For instance, FIG. 5 shows a flowchart 500 for determining a score for a set of alerts by determining each combination of unique associations between the alerts, according to an example embodiment. In one embodiment, flowchart 500 may be implemented by score determiner 322 of alert evaluating system 300, as shown in FIG. 3. Other structural and operational embodiments will be apparent to persons skilled in the relevant art(s) based on the following discussion regarding flowchart 500.

Flowchart 500 begins with step 502. In step 502, each combination of unique associations between all of the alerts in the set of alerts is determined. As an illustrative example with reference to FIG. 3, if alerts [A, B, and C] were part of a set of alerts generated by alert set generator 312, score determiner 322 extracts each unique association between the alerts [A, B, and C]. In this illustrative example, score determiner 322 extracts combinations [A→B, C], [B→A, C], [C→A, B], [A, B→C], [A, C→B], [B, C→A]. For example, the combination [A→B, C] may represent the likelihood that alert [A] is correlated to the occurrence of alert [B] and alert [C].

In step 504, a statistical likelihood of correlation is calculated for each association extracted in step 502. For example, with reference to FIG. 3, score determiner 322 may separately calculate a score for each unique association extracted representing a statistical likelihood that the alerts are correlated with each other. In the example of alerts [A, B, and C], six statistical likelihoods are calculated corresponding to the six unique associations (indicated above with respect to step 502).

In step 506, the maximum calculated value for the extracted combinations is determined. With reference to FIG. 3, for example, score determiner 322 determines the maximum statistical likelihood calculated across each set of alerts. The resulting maximum statistical likelihood may be stored for the set of alerts in model 332, as shown in FIG. 3. With respect to the example of alerts [A, B, and C], the six statistical likelihoods calculated for the six unique association are compared to determine a maximum statistical likelihood. The maximum statistical likelihood is the determined score for the set of alerts [A, B, and C].

Figure 6:
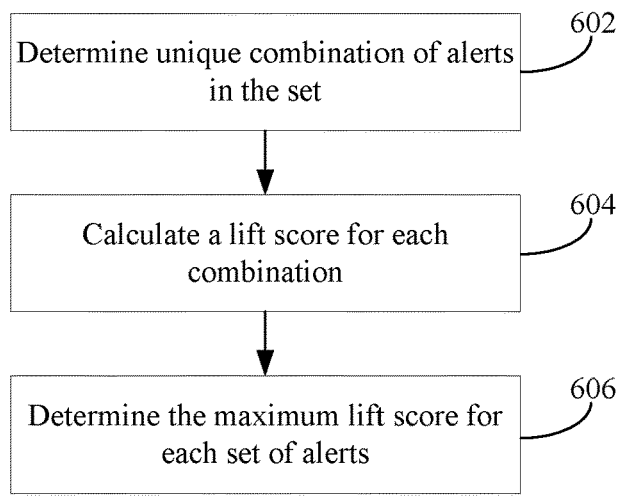
FIG. 6 shows a flowchart for determining a lift score representing a correlation between alerts, according to an example embodiment.

FIG. 6 describes another embodiment in which score determiner 322 may operate to determine a score for a set of alerts. For instance, FIG. 6 shows a flowchart 600 for determining a lift score for a set of alerts by determining each combination of unique associations between the alerts, according to an example embodiment. In an embodiment, flowchart 600 may be implemented by score determiner 322 of alert evaluating system 300, as shown in FIG. 3. Other structural and operational embodiments will be apparent to persons skilled in the relevant art(s) based on the following discussion regarding flowchart 600.

Flowchart 600 begins with step 602. In step 602, each unique combination of associations between all of the alerts in the set of alerts is determined, as in step 502 described above with reference flowchart 500. In the example of alerts [A, B, C], score determiner 322 extracts combinations [A→B, C], [B→A, C], [C→A, B], [A, B→C], [A, C→B], [B, C→A].

In step 604, a lift score is calculated for each combination extracted in step 602. For example, with reference to FIG. 3, score determiner 322 may separately calculate a lift score for each unique association extracted representing a statistical likelihood that the alerts are correlated with each other. In the example of alerts [A, B, and C], six lift scores are calculated corresponding to the six unique associations (indicated above with respect to step 602).

In step 606, the maximum calculated lift score for the extracted combinations is determined. With reference to FIG. 3, for example, score determiner 322 determines the maximum lift score across each set of alerts. The resulting maximum lift score may be stored for the set of alerts in model 332. With respect to the example of alerts [A, B, and C], the six lift scores calculated for the six unique association are compared to determine a maximum statistical likelihood. The maximum statistical likelihood is the determined score for the set of alerts [A, B, and C].

In embodiments, alert evaluating system 108 may also operate to update a model generated in accordance with an embodiment. The model may be updated based on further received sequences of alerts to capture any changes in the types and/or behaviors of incidents being encountered in a service.

Figure 7:
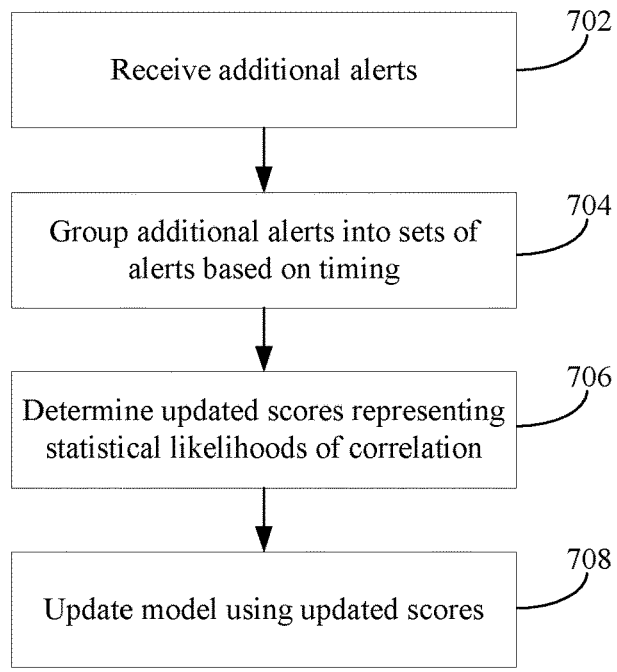
FIG. 7 shows a flowchart for updating a model using additional alerts, according to an example embodiment.

For instance, FIG. 7 shows a flowchart 700 providing a process for reviewing additional alerts to update a model. Flowchart 700 is described with respect to alert evaluating system 108 and alert evaluating system 300 for illustrative purposes. Note that not all steps of flowchart 700 need to be performed in all embodiments. Further structural and operational embodiments will be apparent to persons skilled in the relevant art(s) based on the following description of flowchart 700, alert evaluating system 108, and alert evaluating system 300.

Flowchart 700 begins with step 702. In step 702, new or additional alerts are received, in a manner similar to step 404, described above with reference to FIG. 4. For example, new or additional alerts may be obtained as a history of alerts from any of servers 112A-112N and/or computing device(s) 140. Alerts may be obtained from an alert log as described above with reference to FIGS. 3 and 4, and/or from other source(s).

At step 704, updated alerts are grouped in a manner as described above with respect to step 406 in FIG. 4. For example, the new or additional alerts may be grouped together into sets based on a predetermined relationship between the alerts, such as a timing relationship between alerts, and/or other predetermined relationships described elsewhere herein or that become apparent to persons skilled in the relevant art(s) based on the teachings herein. New or additional alerts may also be grouped together using any combination of contextual information and/or any other predetermined criteria, also as described above with reference to FIG. 4.

In step 706, updated scores are determined that represent statistical likelihoods of correlation between alerts. For example, the updated scores can be determined in the manner described above with respect to step 408 of FIG. 4, or in another manner.

In step 708, a model is updated using the updated scores from step 706. For example, with reference to FIG. 3, model 332 may be updated using updated scores. The step of updating the model may include modifying existing model 332 or creating a new model to replace model 332. For instance, model 332 may be modified to add one or more sets of new sets of alerts with corresponding determined scores, removing one or more sets of alerts and their corresponding score (e.g., based on age, type of alert, etc.), and/or or revising an existing score based on updated calculation for one or more sets of set of alerts. The updated model may then be stored in a manner as described above with respect to FIG. 3.

Figure 8:
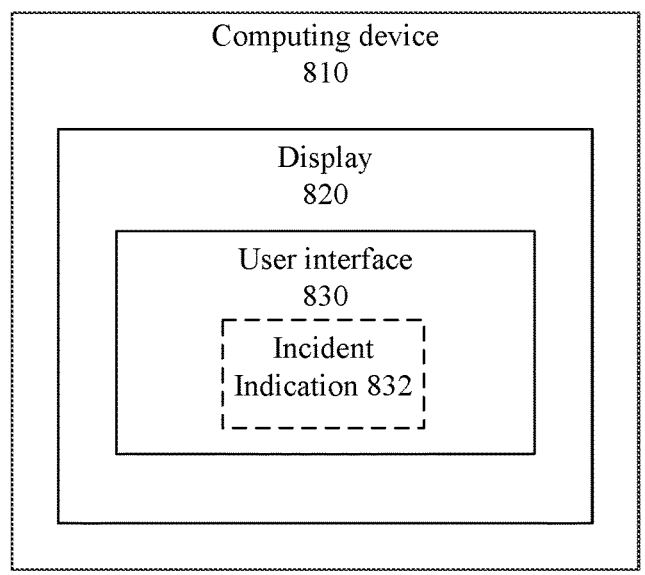
FIG. 8 shows an exemplary user interface for providing an indication of an incident to a system administrator, according to an example embodiment.

As described above, in an embodiment, after a determination is made validating a potential security incident as a legitimate threat, an incident indication may be provided to a system administrator. For instance, FIG. 8 shows computing device 810, which may be included in or connected to any of computing device(s) 140 used by a system administrator in charge of managing and/or monitoring the security of any of servers 112A-112N, network 110, and/or any other device connected to network 110. In this example, computing device 810 may contain a display 820, which may be any suitable display, such as a liquid crystal display, cathode ray tube display, light-emitting diode display, or any other type of display connectable to computing device 810. Display 820 may be external to, or incorporated in computing device 810. Display 820 may contain a user interface 830 that displays, among other things, information to a system administrator regarding the security of any of servers 112A-112N, network 110, and/or devices connected to network 110. User interface 830 is an example of user interface 334 (FIG. 3). In an embodiment, incident indication 832 may be displayed on user interface 830 of computing device 810. Computing device 810 may also include other peripheral output devices (not shown) such as speakers and printers. In another embodiment, incident indication may be transmitted to any such peripheral device attached to computing device 810.

III. Example Computer System Implementation

Computing device(s) 140, computing devices 150, computing devices 160, servers 112A-112N, alert evaluating system 108, model generator 302, incident validator 304, alert set generator 312, score determiner 322, alert chain searcher 314, score analyzer 324, user interface 334, user interface 830, flowchart 200, flowchart 400, flowchart 500, flowchart 600, and/or flowchart 700 may be implemented in hardware, or hardware combined with software and/or firmware. For example, alert evaluating system 108, model generator 302, incident validator 304, alert set generator 312, score determiner 322, alert chain searcher 314, score analyzer 324, user interface 334, user interface 830, flowchart 200, flowchart 400, flowchart 500, flowchart 600, and/or flowchart 700 may be implemented as computer program code/instructions configured to be executed in one or more processors and stored in a computer readable storage medium. In another embodiment, alert evaluating system 108, model generator 302, incident validator 304, alert set generator 312, score determiner 322, alert chain searcher 314, score analyzer 324, user interface 334, user interface 830, flowchart 200, flowchart 400, flowchart 500, flowchart 600, and/or flowchart 700 may also be implemented in hardware that operates software as a service (SaaS) or platform as a service (PaaS). Alternatively, alert evaluating system 108, model generator 302, incident validator 304, alert set generator 312, score determiner 322, alert chain searcher 314, score analyzer 324, user interface 334, user interface 830, flowchart 200, flowchart 400, flowchart 500, flowchart 600, and/or flowchart 700 may be implemented as hardware logic/electrical circuitry.

For instance, in an embodiment, one or more, in any combination, of alert evaluating system 108, model generator 302, incident validator 304, alert set generator 312, score determiner 322, alert chain searcher 314, score analyzer 324, user interface 334, user interface 830, flowchart 200, flowchart 400, flowchart 500, flowchart 600, and/or flowchart 700 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
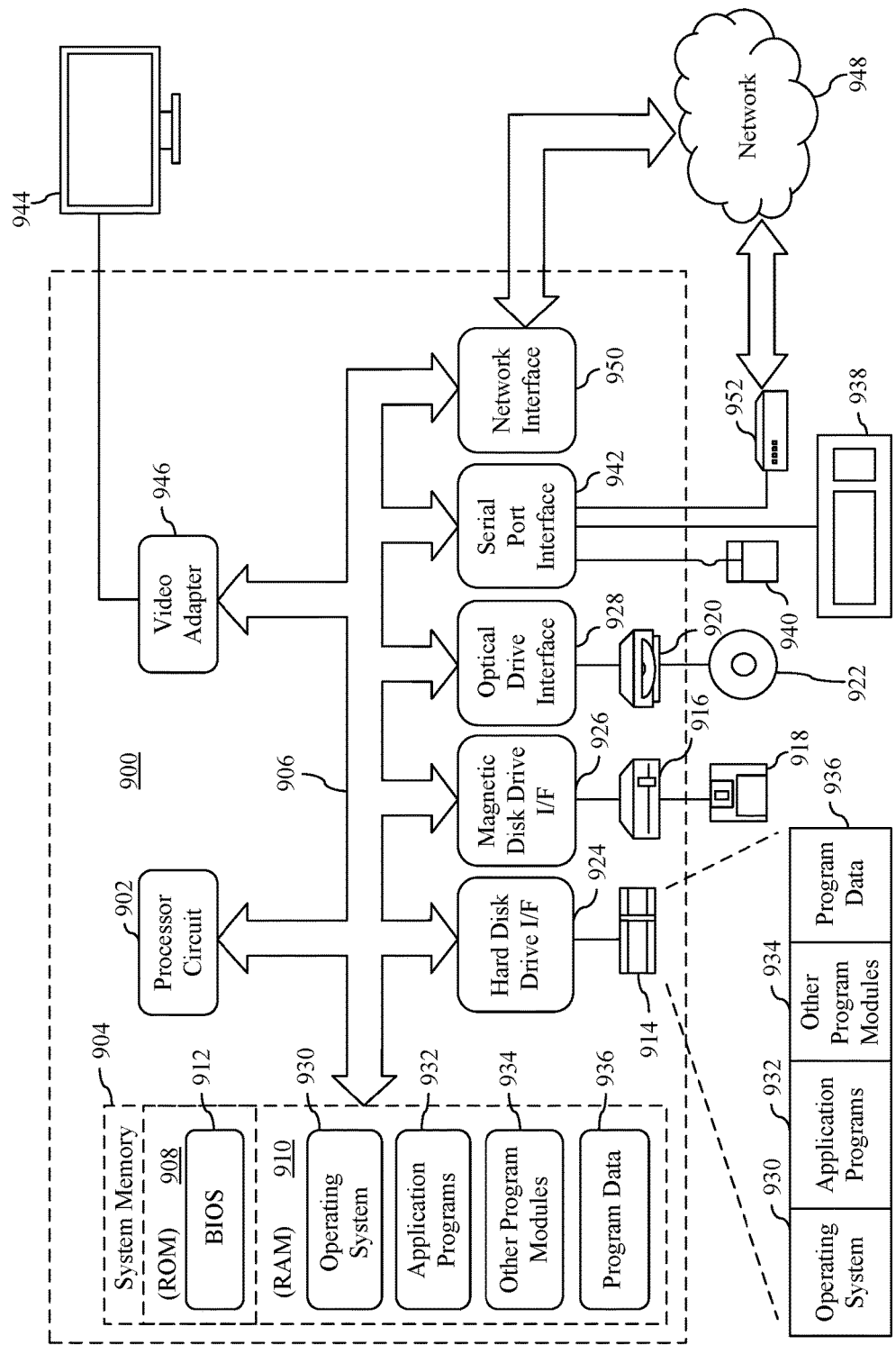
FIG. 9 is a block diagram of an example processor-based computer system that may be used to implement various embodiments.

FIG. 9 depicts an exemplary implementation of a computing device 1000 in which embodiments may be implemented. For example, computing device(s) 140, computing devices 150, computing devices 160, and/or servers 112A-112N may each be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing alert evaluating system 108, model generator 302, incident validator 304, alert set generator 312, score determiner 322, alert chain searcher 314, score analyzer 324, user interface 334, user interface 830, flowchart 200, flowchart 400, flowchart 500, flowchart 600, and/or flowchart 700 (including any suitable step of flowcharts 200, 400, 500, 600, and 700), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers. Display screen 944, and/or any other peripheral output devices (not shown) may be used for implementing user interface 830, and/or any further embodiments described herein.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 10, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900. Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method of evaluating a chain of alerts is described herein. The method includes: grouping a plurality of alerts into a plurality of sets of alerts based on a predetermined relationship between the alerts; determining, for each set of alerts, a score representing a statistical likelihood that at least one alert in the set of alerts is correlated to at least one other alert in the set of alerts, to determine a plurality of scores for the sets; forming a model that includes the determined scores; receiving a chain of alerts; determining if the chain of alerts corresponds to a score in the model; in response to determining that the chain of alerts corresponds to a score in the model, determining whether the score in the model corresponding to the chain of alerts meets a predetermined criteria; and in response to determining the score in the model corresponding to the chain of alerts meets the predetermined criteria, providing an indication to a user.

In one embodiment of the foregoing method, the determining, for each set of alerts, a score representing a statistical likelihood that at least one alert in the set of alerts is correlated to at least one other alert in the set of alerts comprises, for each set of alerts: determining each combination of unique associations between the alerts in the set of alerts; calculating, for each combination of unique associations, a statistical likelihood that at least one alert in the set of alerts is correlated to at least one other alert in the set of alerts, to calculate a plurality of statistical likelihoods; and determining a maximum value of the calculated statistical likelihoods to be the score for the set of alerts.

In another embodiment of the foregoing method, the determining, for each set of alerts, a score representing a statistical likelihood that at least one alert in the set of alerts is correlated to at least one other alert in the set of alerts comprises: calculating a lift score for at least one combination of alerts in the set of alerts.

In another embodiment of the foregoing method, the determining whether the score in the model corresponding to the chain of alerts meets a predetermined criteria comprises: determining whether the score in the model corresponding to the chain of alerts has a predetermined relationship with a threshold value, and in response to determining the score in the model corresponding to the chain of alerts has the predetermined relationship with the threshold value, providing an indication to a user.

In another embodiment of the foregoing method, in response to determining the chain of alerts does not correspond to a score in the model or that the score in the model corresponding to chain of alerts does not meet the predetermined criteria, iteratively creating additional sub-chains of alerts that include one less alert than a prior iteration and determining whether the additional sub-chains of alerts exist in the model until an additional sub-chain is determined to exist in the model and a score corresponding to the additional sub-chain meets the predetermined criteria, or only two alerts remain in the sub-chain of alerts that are not a chain of alerts with a corresponding score in the model.

In another embodiment of the foregoing method, the method further comprises: discarding the chain of alerts in response to at least one of determining the model does not contain a score for any chain of alerts or sub-chains of alerts, or determining the score corresponding to each of the alerts or the sub-chains of alerts located in the model does not meet the predetermined criteria.

In another embodiment of the foregoing method, the method further comprises: grouping a plurality of second alerts into a plurality of sets of second alerts based on a predetermined relationship between the second alerts; determining, for each set of second alerts, a score representing a statistical likelihood that at least one alert in the set of second alerts is correlated to at least one other alert in the set of second alerts, to determine a plurality of second scores; and updating the model based on the plurality of second scores, wherein said updating includes at least one of adding, removing, or revising scores in the model.

A chain of alert evaluating system in a computing device is described herein. The chain of alert evaluating system includes: an alert set generator configured to group received alerts into a plurality of sets of alerts based on predetermined relationships between the received alerts; a score determiner that determines, for each set of alerts, a score representing a statistical likelihood that at least one alert in the set of alerts is correlated to at least one other alert in the set of alerts, to determine a plurality of scores for the sets, and stores the determined scores in a model; an alert chain searcher that receives a chain of alerts, and is configured to determine whether the received chain of alerts corresponds to a score in the model; a score analyzer configured to, in response to a determination by the alert chain searcher that the chain of alerts corresponds to a score in the model, determine whether the score in the model corresponding to the chain of alerts meets a predetermined criteria; and a user interface configured to, in response to a determination by the score analyzer that the score in the model corresponding to the chain of alerts meets the predetermined criteria, provide an indication to a user of a received incident.

In one embodiment of the foregoing system, the score determiner is further configured to: determine each combination of unique associations between the alerts in the set of alerts; calculate, for each combination of unique associations, a statistical likelihood that at least one alert in the set of alerts is correlated to at least one other alert in the set of alerts, to calculate a plurality of statistical likelihoods; and determine a maximum value of the calculated statistical likelihoods to be the score for the set of alerts.

In another embodiment of the foregoing system, the score determiner is further configured to: calculate a lift score for at least one combination of alerts in the set of alerts.

In another embodiment of the foregoing system, the score analyzer is further configured to: determine whether the score in the model corresponding to the chain of alerts has a predetermined relationship with a threshold value, and provide an indication to a user in response to determining the score in the model corresponding to the chain of alerts has the predetermined relationship with the threshold value.

In another embodiment of the foregoing system, wherein in response to a determination that the chain of alerts does not correspond to a score in the model or that the score in the model corresponding to chain of alerts does not meet the predetermined criteria, the alert chain searcher is further configured to: iteratively generate additional sub-chains of alerts that include one less alert than a prior iteration and determine whether the additional sub-chains of alerts exist in the model until an additional sub-chain is determined to exist in the model and a score corresponding to the additional sub-chain meets the predetermined criteria, or only two alerts remain in the sub-chain of alerts that are not a chain of alerts with a corresponding score in the model.

In another embodiment of the foregoing system, the alert chain searcher is further configured to: discard the chain of alerts in response to at least one of a determination that the model does not contain a score for any chain of alerts or sub-chains of alerts, or a determination that the score corresponding to each of the alerts or the sub-chains of alerts located in the model does not meet the predetermined criteria.

In another embodiment of the foregoing system, the alert set generator is further configured to: group a plurality of second alerts into a plurality of sets of second alerts based on predetermined relationships between the second alerts; and wherein said score determiner is further configured to: determine, for each set of second alerts, a score representing a statistical likelihood that at least one alert in the set of second alerts is correlated to at least one other alert in the set of second alerts, to determine a plurality of second scores; and update the model based on the plurality of second scores, wherein an update includes at least one of adding, removing, or revising scores in the model.

A computer-readable storage medium having program instructions recorded thereon that, when executed by at least one processing circuit, perform a method on a computing device for evaluating a chain of alerts, is described herein. The method includes: grouping a plurality of alerts into a plurality of sets of alerts based on a predetermined relationship between the alerts; determining, for each set of alerts, a score representing a statistical likelihood that at least one alert in the set of alerts is correlated to at least one other alert in the set of alerts, to determine a plurality of scores for the sets; forming a model that includes the determined scores; receiving a chain of alerts; determining if the chain of alerts corresponds to a score in the model; in response to determining that the chain of alerts corresponds to a score in the model, determining whether the score in the model corresponding to the chain of alerts meets a predetermined criteria; and in response to determining the score in the model corresponding to the chain of alerts meets the predetermined criteria, providing an indication to a user.

In one embodiment of the foregoing computer-readable storage medium, the determining, for each set of alerts, a score representing a statistical likelihood that at least one alert in the set of alerts is correlated to at least one other alert in the set of alerts comprises, for each set of alerts: determining each combination of unique associations between the alerts in the set of alerts; calculating, for each combination of unique associations, a statistical likelihood that at least one alert in the set of alerts is correlated to at least one other alert in the set of alerts, to calculate a plurality of statistical likelihoods; and determining a maximum value of the calculated statistical likelihoods to be the score for the set of alerts.

In another embodiment of the foregoing computer-readable storage medium, the determining, for each set of alerts, a score representing a statistical likelihood that at least one alert in the set of alerts is correlated to at least one other alert in the set of alerts comprises: calculating a lift score for at least one combination of alerts in the set of alerts.

In another embodiment of the foregoing computer-readable storage medium, the determining whether the score in the model corresponding to the chain of alerts meets a predetermined criteria comprises: determining whether the score in the model corresponding to the chain of alerts has a predetermined relationship with a threshold value, and in response to determining the score in the model corresponding to the chain of alerts has the predetermined relationship with the threshold value, providing an indication to a user.

In another embodiment of the foregoing computer-readable storage medium, in response to determining the chain of alerts does not correspond to a score in the model or that the score in the model corresponding to chain of alerts does not meet the predetermined criteria, iteratively creating additional sub-chains of alerts that include one less alert than a prior iteration and determining whether the additional sub-chains of alerts exist in the model until an additional sub-chain is determined to exist in the model and a score corresponding to the additional sub-chain meets the predetermined criteria, or only two alerts remain in the sub-chain of alerts that are not a chain of alerts with a corresponding score in the model.

In another embodiment of the foregoing computer-readable storage medium, the computer-readable storage medium further comprising: discarding the chain of alerts in response to at least one of determining the model does not contain a score for any chain of alerts or sub-chains of alerts, or determining the score corresponding to each of the alerts or the sub-chains of alerts located in the model does not meet the predetermined criteria.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of evaluating a chain of alerts, comprising:
grouping a plurality of alerts into a plurality of sets of alerts based on at least one predetermined relationship between the alerts;
determining, for each set of alerts, a score representing a statistical likelihood that at least one alert in the set of alerts is correlated to at least one other alert in the set of alerts, to determine a plurality of scores for the sets;
forming a model that includes the determined scores;
receiving a chain of alerts;
determining if the chain of alerts corresponds to a score in the model;
in response to determining that the chain of alerts corresponds to a score in the model, determining whether the score in the model corresponding to the chain of alerts meets a predetermined criteria; and
in response to determining the score in the model corresponding to the chain of alerts meets the predetermined criteria, providing an indication to a user.

2. The method of claim 1, wherein said determining, for each set of alerts, a score representing a statistical likelihood that at least one alert in the set of alerts is correlated to at least one other alert in the set of alerts comprises, for each set of alerts:
determining each combination of unique associations between the alerts in the set of alerts;
calculating, for each combination of unique associations, a statistical likelihood that at least one alert in the set of alerts is correlated to at least one other alert in the set of alerts, to calculate a plurality of statistical likelihoods; and
determining a maximum value of the calculated statistical likelihoods to be the score for the set of alerts.

3. The method of claim 1, wherein said determining, for each set of alerts, a score representing a statistical likelihood that at least one alert in the set of alerts is correlated to at least one other alert in the set of alerts comprises:
calculating a lift score for at least one combination of alerts in the set of alerts.

4. The method of claim 1, wherein said determining whether the score in the model corresponding to the chain of alerts meets a predetermined criteria comprises:
determining whether the score in the model corresponding to the chain of alerts has a predetermined relationship with a threshold value, and
in response to determining the score in the model corresponding to the chain of alerts has the predetermined relationship with the threshold value, providing an indication to a user.

5. The method of claim 1, wherein in response to determining the chain of alerts does not correspond to a score in the model or that the score in the model corresponding to chain of alerts does not meet the predetermined criteria,
iteratively creating additional sub-chains of alerts that include one less alert than a prior iteration and determining whether the additional sub-chains of alerts exist in the model until
an additional sub-chain is determined to exist in the model and a score corresponding to the additional sub-chain meets the predetermined criteria, or
only two alerts remain in the sub-chain of alerts that are not a chain of alerts with a corresponding score in the model.

6. The method of claim 5, further comprising:
discarding the chain of alerts in response to at least one of
determining the model does not contain a score for any chain of alerts or sub-chains of alerts, or
determining the score corresponding to each of the alerts or the sub-chains of alerts located in the model does not meet the predetermined criteria.

7. The method of claim 1, further comprising:
grouping a plurality of second alerts into a plurality of sets of second alerts based on at least one predetermined relationship between the second alerts;
determining, for each set of second alerts, a score representing a statistical likelihood that at least one alert in the set of second alerts is correlated to at least one other alert in the set of second alerts, to determine a plurality of second scores; and
updating the model based on the plurality of second scores, wherein said updating includes at least one of adding, removing, or revising scores in the model.

8. A chain of alert evaluating system in a computing device, comprising:
an alert set generator configured to group received alerts into a plurality of sets of alerts based on at least one predetermined relationship between the received alerts;
a score determiner that determines, for each set of alerts, a score representing a statistical likelihood that at least one alert in the set of alerts is correlated to at least one other alert in the set of alerts, to determine a plurality of scores for the sets, and stores the determined scores in a model;
an alert chain searcher that receives a chain of alerts, and is configured to determine whether the received chain of alerts corresponds to a score in the model;
a score analyzer configured to, in response to a determination by the alert chain searcher that the chain of alerts corresponds to a score in the model, determine whether the score in the model corresponding to the chain of alerts meets a predetermined criteria; and
a user interface configured to, in response to a determination by the score analyzer that the score in the model corresponding to the chain of alerts meets the predetermined criteria, provide an indication to a user of a received incident.

9. The system of claim 8, wherein said score determiner is further configured to:
determine each combination of unique associations between the alerts in the set of alerts;
calculate, for each combination of unique associations, a statistical likelihood that at least one alert in the set of alerts is correlated to at least one other alert in the set of alerts, to calculate a plurality of statistical likelihoods; and
determine a maximum value of the calculated statistical likelihoods to be the score for the set of alerts.

10. The system of claim 8, wherein said score determiner is further configured to:
calculate a lift score for at least one combination of alerts in the set of alerts.

11. The system of claim 8, wherein said score analyzer is further configured to:
determine whether the score in the model corresponding to the chain of alerts has a predetermined relationship with a threshold value, and
provide an indication to a user in response to determining the score in the model corresponding to the chain of alerts has the predetermined relationship with the threshold value.

12. The system of claim 8, wherein in response to a determination that the chain of alerts does not correspond to a score in the model or that the score in the model corresponding to chain of alerts does not meet the predetermined criteria, the alert chain searcher is further configured to:
iteratively generate additional sub-chains of alerts that include one less alert than a prior iteration and determine whether the additional sub-chains of alerts exist in the model until
an additional sub-chain is determined to exist in the model and a score corresponding to the additional sub-chain meets the predetermined criteria, or
only two alerts remain in the sub-chain of alerts that are not a chain of alerts with a corresponding score in the model.

13. The system of claim 12, wherein said alert chain searcher is further configured to:
discard the chain of alerts in response to at least one of
a determination that the model does not contain a score for any chain of alerts or sub-chains of alerts, or
a determination that the score corresponding to each of the alerts or the sub-chains of alerts located in the model does not meet the predetermined criteria.

14. The system of claim 8, wherein said alert set generator is further configured to:
group a plurality of second alerts into a plurality of sets of second alerts based on at least one predetermined relationship between the second alerts; and
wherein said score determiner is further configured to:
determine, for each set of second alerts, a score representing a statistical likelihood that at least one alert in the set of second alerts is correlated to at least one other alert in the set of second alerts, to determine a plurality of second scores; and
update the model based on the plurality of second scores, wherein an update includes at least one of adding, removing, or revising scores in the model.

15. A computer-readable storage medium having program instructions recorded thereon that, when executed by at least one processing circuit, perform a method on a computing device for evaluating a chain of alerts, the method comprising:
grouping a plurality of alerts into a plurality of sets of alerts based on at least one predetermined relationship between the alerts;
determining, for each set of alerts, a score representing a statistical likelihood that at least one alert in the set of alerts is correlated to at least one other alert in the set of alerts, to determine a plurality of scores for the sets;
forming a model that includes the determined scores;
receiving a chain of alerts;
determining if the chain of alerts corresponds to a score in the model;
in response to determining that the chain of alerts corresponds to a score in the model, determining whether the score in the model corresponding to the chain of alerts meets a predetermined criteria; and
in response to determining the score in the model corresponding to the chain of alerts meets the predetermined criteria, providing an indication to a user.

16. The computer-readable storage medium of claim 15, wherein said determining, for each set of alerts, a score representing a statistical likelihood that at least one alert in the set of alerts is correlated to at least one other alert in the set of alerts comprises, for each set of alerts:
determining each combination of unique associations between the alerts in the set of alerts;
calculating, for each combination of unique associations, a statistical likelihood that at least one alert in the set of alerts is correlated to at least one other alert in the set of alerts, to calculate a plurality of statistical likelihoods; and
determining a maximum value of the calculated statistical likelihoods to be the score for the set of alerts.

17. The computer-readable storage medium of claim 15, wherein said determining, for each set of alerts, a score representing a statistical likelihood that at least one alert in the set of alerts is correlated to at least one other alert in the set of alerts comprises:
calculating a lift score for at least one combination of alerts in the set of alerts.

18. The computer-readable storage medium of claim 15, wherein said determining whether the score in the model corresponding to the chain of alerts meets a predetermined criteria comprises:
determining whether the score in the model corresponding to the chain of alerts has a predetermined relationship with a threshold value, and
in response to determining the score in the model corresponding to the chain of alerts has the predetermined relationship with the threshold value, providing an indication to a user.

19. The computer-readable storage medium of claim 15, wherein in response to determining the chain of alerts does not correspond to a score in the model or that the score in the model corresponding to chain of alerts does not meet the predetermined criteria,
iteratively creating additional sub-chains of alerts that include one less alert than a prior iteration and determining whether the additional sub-chains of alerts exist in the model until
an additional sub-chain is determined to exist in the model and a score corresponding to the additional sub-chain meets the predetermined criteria, or
only two alerts remain in the sub-chain of alerts that are not a chain of alerts with a corresponding score in the model.

20. The computer-readable storage medium of claim 19, further comprising:
discarding the chain of alerts in response to at least one of
determining the model does not contain a score for any chain of alerts or sub-chains of alerts, or
determining the score corresponding to each of the alerts or the sub-chains of alerts located in the model does not meet the predetermined criteria.

* * * * *